(12) United States Patent
Hong et al.

(10) Patent No.: US 9,152,687 B2
(45) Date of Patent: Oct. 6, 2015

(54) CROSS DOMAIN LOCKING IN A DISTRIBUTED ENVIRONMENT

(71) Applicant: NetApp, Inc., Sunnyvale, CA (US)

(72) Inventors: Luan Hong, Raleigh, NC (US); Dean Kalman, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 219 days.

(21) Appl. No.: 13/910,883

(22) Filed: Jun. 5, 2013

(65) Prior Publication Data

US 2014/0365433 A1 Dec. 11, 2014

(51) Int. Cl.
*G06F 17/30* (2006.01)
*G06F 9/46* (2006.01)

(52) U.S. Cl.
CPC .......... *G06F 17/30581* (2013.01); *G06F 9/466* (2013.01); *G06F 17/30377* (2013.01)

(58) Field of Classification Search
CPC .............. G06F 17/30377; G06F 9/466; G06F 17/30581

USPC .......................................................... 707/611
See application file for complete search history.

(56) References Cited

U.S. PATENT DOCUMENTS

2002/0087366 A1* 7/2002 Collier et al. ..................... 705/5
2009/0217274 A1* 8/2009 Corbin et al. ................. 718/101

* cited by examiner

*Primary Examiner* — Jensen Hu
(74) *Attorney, Agent, or Firm* — Gillilam IP PLLC (57) ABSTRACT

In a distributed system, multiple nodes of a cluster update target data using a cross-domain lock. In the distributed system, data is separated into different domains, where some data elements are part of multiple domains. Multiple nodes each store a copy of the target data, which can be part of a single domain, or part of multiple domains. Where at least one element of the target data is part of two different domains, the nodes use cross-domain locks to lock both domains for at least a portion of the data update, and update the data while the lock is active. After updating the data, the nodes can release the cross-domain lock.

20 Claims, 9 Drawing Sheets

CROSS DOMAIN LOCKING IN A DISTRIBUTED ENVIRONMENT

FIELD

Embodiments described are related generally to data coherency, and embodiments described are more particularly related to using cross domain locking for data updates in a distributed environment.

COPYRIGHT NOTICE/PERMISSION

Portions of the disclosure of this patent document can contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below. Copyright © 2013, NetApp, Inc., All Rights Reserved.

BACKGROUND

Distributed systems may include multiple nodes storing copies of the same data locally at the nodes. In some distributed systems, there is a strong consistency requirement throughout the system, making it important to implement procedures to maintain consistency of data stored by the nodes. Examples of distributed systems having consistency requirements can include data serving systems where multiple caches access the same storage. Each cache can be considered a node in the distributed system.

One approach to consistency requirements in a distributed system is the Two-Phase Commit Protocol (2PC). 2PC is a blocking protocol that operates from two phases: a vote phase, and a commit phase. It will be understood that there are other ways to maintain consistency within the distributed system. Data consistency operations typically lock the data during updates to prevent access to the data. The locking of the data can prevent data becoming inconsistent while the updates occur, but it can negatively affect system performance during the update process.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

Descriptions of certain details and embodiments follow, including a description of the figures, which can depict some or all of the embodiments described below, as well as discussing other potential embodiments or implementations of the inventive concepts presented herein.

DETAILED DESCRIPTION

In a distributed system, multiple nodes of a cluster update target data using a cross-domain lock. In the distributed system, data is separated into different domains, where some data elements are part of multiple domains. Multiple nodes each store a copy of the target data, which can be part of a single domain, or part of multiple domains. Where at least one element of the target data is part of two different domains, the nodes use cross-domain locks to lock both domains for at least a portion of the data update, and update the data while the lock is active. After updating the data, the nodes can release the cross-domain lock.

By separating data into different domains, the system can limit locking to a specific domain for a data update. However, there are cases in which a data element is part of multiple domains, which can be referred to as overlapping data. Cross-domain locking can address circumstances where overlapping data exists or where data elements are part of multiple domains. A distributed system is a networked system of nodes or entities and data accessible by the nodes, where copies of an element of data can be in one or more nodes within the system. An example of a distributed system is a system of networked caches that provides access to data from a central store or database of information. A node can be any type of computing device, such as a server, storage server, or other networked device that can store or cache a copy of an element of the data. The data element can be an atomic value within the system, for example, a 32-bit number in a 32-bit system, or a group of atomic values, for example, a file, data block, or array.

In one embodiment, cross-domain locking can be used with cache coherency techniques. For example, a system can employ cross-domain locking to implement 2-phase commit protocol (2PC) with a locking hierarchy in an asynchronous distributed environment. It will be understood that 2PC provides for locking during its two phases as a mechanism for ensuring coherency. However, cross-domain locking can provide an additional layer of locking that covers a scenario in which protected data is overlapped between different domains. The system can implement a cross-domain lock as a higher order 2PC lock to synchronize updates from 2PC domain-based locks. In one embodiment, the system can hold or maintain the locks to ensure that each node has committed an update transaction prior to releasing the lock.

Figure 1:
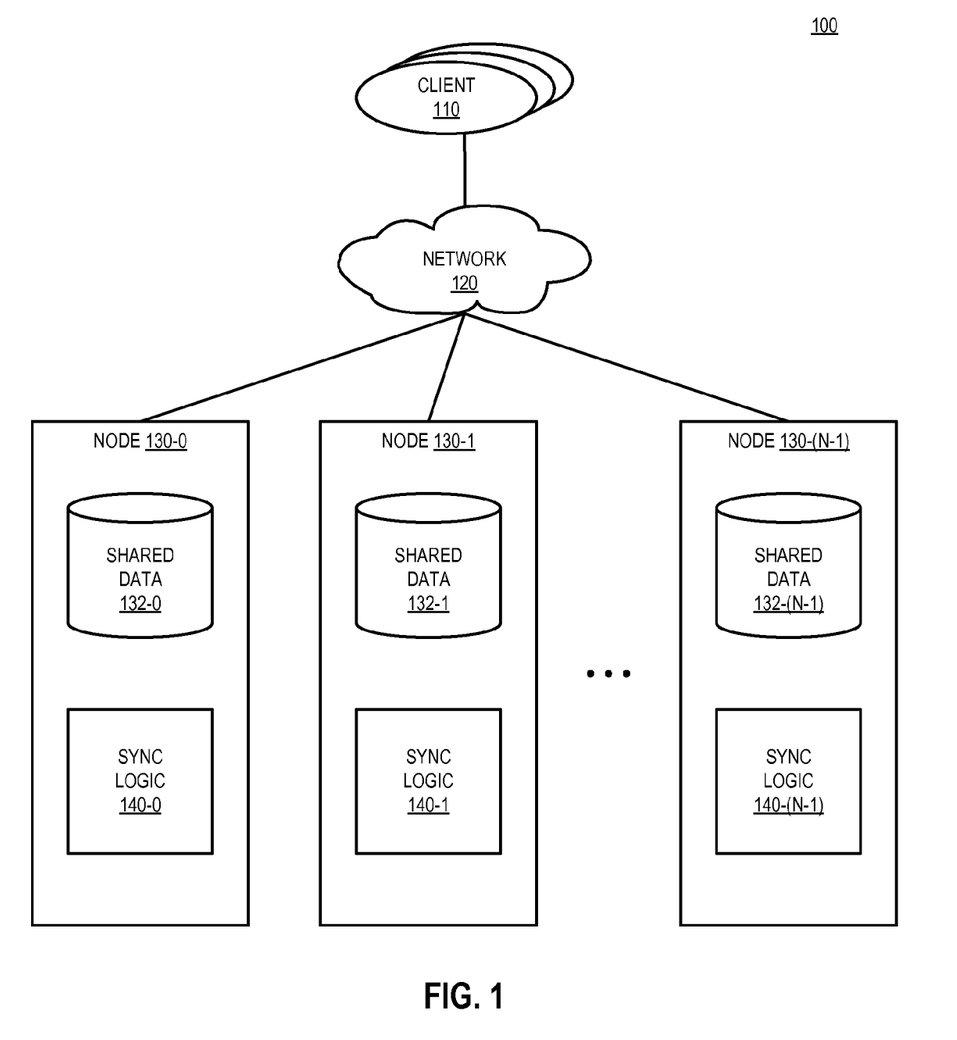
FIG. 1 is a block diagram of an embodiment of a distributed system having multiple nodes with shared data and update logic to maintain coherency of the shared data.

FIG. 1 is a block diagram of an embodiment of a distributed system having multiple nodes with shared data and update logic to maintain coherency of the shared data. System 100 is a distributed system with N nodes 130 (130-0 through 130-(N–1)). Each node can be a server, storage server, or data caching appliance on a network or other device that processes requests to access data elements of a data store, such as a database or element of a storage system. Each node can include a cache having some or all elements of the data store. As used herein, the data store may be referred to as a database, which is understood to be any data structure or mechanism of structured data management. Nodes 130 include a copy of shared data 132 (132-0 through 132-(N–1), respectively). The nodes of a system such as system 100 are frequently referred to as "cohorts" or "cohort nodes," or "cohort caches." From one perspective, "nodes" can be understood more generally to refer to all entities on the distributed network that may participate in an update coordination of shared data.

"Cohorts" may be understood to specifically refer to nodes that participate in a particular group and will be updated together. For example, a cohort can refer to a node that caches data, whereas another node may not cache certain data, and thus not be in the cohort with respect to that data. As another example, multiple databases can be distributed through a network, and certain nodes cache one database but not another. Thus, not all nodes will include all the same data elements, and updating can be specific to a group or set to which a node belongs. Thus, shared data 132 is not necessarily identical in every node 130, but is data which is shared with at least some other node in system 100.

In one embodiment, one or more of nodes 130 is a storage server with caching that has a distributed architecture. A storage server having a distributed architecture can be implemented with multiple distributed storage servers. The distributed architecture can include physically separate network modules ("N-modules") and data/disk modules ("D-modules") (not shown). The separate modules can communicate with other storage servers, and with a data coordinator for purposes of cache coherency, over an external interconnect. The N-module acts as a front-end of the storage server, exporting services to clients, while the D-module acts as a backend, managing the underlying storage of the storage server. The N- and D-modules can be contained in separate housings and communicate with each other via network connections. Thus, the N-module and the D-module enable a storage server to be physically separated into multiple modules that can be distributed across a network, where individual modules can be added according to need (e.g., add more N-modules for a very active front-end, or more D-modules for heavy data access/processing operations), in a modular fashion.

Clients 110 represent other systems and/or programs that make requests for data stored on or managed by nodes 130. Nodes 130 typically communicate with each other over network 120. Clients 110 can also interact with nodes 130 over network 120. Network 120 can be any type or combination of local area networks and/or wide area networks. Network 120 includes hardware devices to switch and/or route traffic from clients 110 to nodes 130, typically as sequences and/or groups of data packets. The hardware devices communicate over network channels via one or more protocols as is understood in the art.

Each node 130 includes corresponding update logic 140 (140-0 through 140-(N–1), respectively). Update logic 140 enables nodes 130 to perform a coordinated data update with one or more other nodes. The node that initiates the data update can be referred to as an "originator" or a "coordinator," while the other node or nodes are "participant(s)." In one embodiment, the originator processes a request from a client that causes the update to protected data that is kept coherent in distributed system 100. To maintain data consistency in the system, the originator can propose the update to other participants. As described in more detail below, for example, with respect to FIG. 2, update logic 140 or nodes 130 implement cross-domain locks for shared data 132 that is subject to an update. The data that is the subject of the update can be referred to as "target data."

In one embodiment, update logic 140 exists as code executed on node 130. In one embodiment, update logic 140 is a module that is part of an operating system of node 130. In one embodiment, update logic 140 is at least partially implemented in hardware within node 130. In one embodiment, nodes 130 use update logic 140 to coordinate all coherency operations. Nodes 130 can receive proposals or updates as participants via update logic 140. Nodes 130 can generate proposals via update logic 140. Thus, update logic 140 represents mechanisms used to generate and/or respond to update operations.

Figure 2:
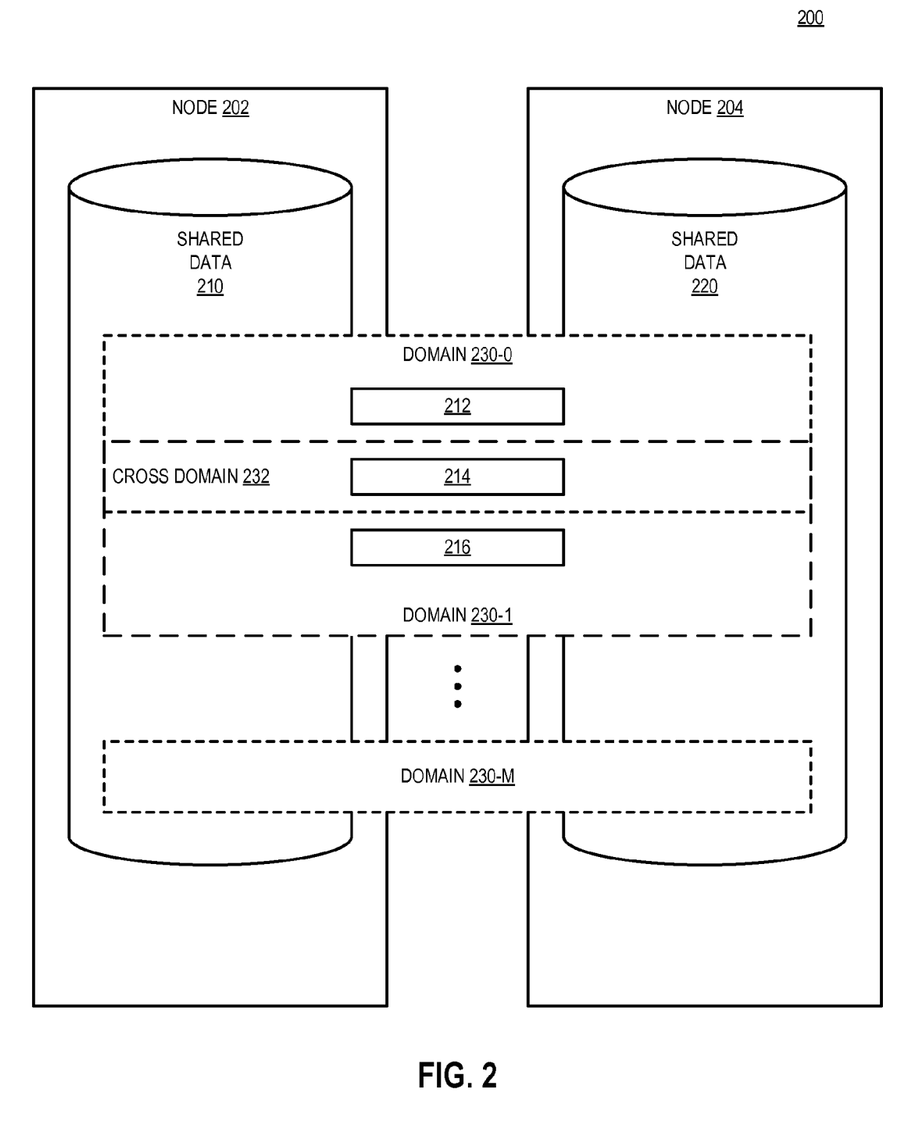
FIG. 2 is a block diagram of an embodiment of a distributed system where two nodes have data crosses multiple domains.

FIG. 2 is a block diagram of an embodiment of a distributed system where two nodes have data crosses multiple domains. Nodes 202 and 204 are examples of nodes 130 of system 100. System 200 is a simplified distributed environment, and can be one example of a system in accordance with system 100. System 200 is simplified in that only two nodes are illustrated. Node 202 includes shared data 210, and node 204 includes shared data 220. At least a portion of shared data 210 and shared data 220 include the same data, and system 200 will try to maintain consistency between nodes 202 and 204 when a data update is made.

As mentioned above, data stored in shared data 210 and 220 can be organized as multiple domains. For simplification, only three data elements of protected data, 212, 214, and 216 are illustrated. Domain 230-0 is shown including elements 212 and 214. Domain 230-1 is shown including elements 214 and 216. Thus, data element 214 is shared among multiple domains, and is shown as cross-domain 232. The organization of data into domains 230 (230-0 through 230-M) is implementation specific, and is generally determined by an administrator prior to a time in which data is updated. During data updates within domain 230-0, update logic (not specifically shown) locks data elements within the domain (including element 212 and 214) for update operations. Similarly, during data updates within domain 230-1, update logic locks data elements within the domain (including data elements 214 and 216) for update operations.

When protected data is overlapped between different domains (such as between domains 230-0 and 230-1), domain-based update transactions could potentially overwrite each other and cause unpredictable results. Thus, in addition to domain-based locks for domain-based update operations, system 200 implements higher order locks, referred to as cross-domain locks, to synchronize domain-based updates. A data updater or update logic can determine that at least a portion of the target data is part of multiple domains, and implement cross-domain locks.

The update logic can implement cross-domain locks in one of several ways. In one embodiment, when the update logic determines that a data domain includes overlapping data (or data that is part of multiple domains), the update logic temporarily redefines the data domain boundaries. Thus, for example, domains 230-0 and 230-1 can be combined into a single domain for purposes of the data updating. Nodes 202 and 204 can coordinate data updates with the two domains defined as a single domain, and then release the lock on both domains, and restore the data domain boundaries. Such an approach benefits from simplicity, even though it will reduce overall throughput by penalizing data updates of non-overlapping data. For example, while system 200 can avoid unpredictable results by locking domains 230-0 and 230-1 while updating element 214, the system causes a performance penalty by locking domain 230-1 while updating element 212.

In one embodiment, the update logic separates data updates into two groups of updates. One group of updates includes updates for non-overlapped data, which are coordinated using domain-based update transactions. The other group of updates includes updates for overlapped data, which are coordinated using cross-domain transactions. Cross-domain transactions can be reserved for use only when overlapping data exists in the target data. Such an approach can separate operations that need a cross-domain lock from those which do not, even though such an implementation would likely require update logic in both types of update transactions. For example, nodes 202 and 204 would include separate update logic for domain-based transaction and cross-domain transactions.

In one embodiment, the update logic coordinates all data updates through domain-based update transactions or local domain transactions (local domain referring to a single domain for the target data, meaning no overlapping data is present). Whenever overlapping data is affected by the data update, the update logic first acquires a cross-domain transaction before initiating a domain-based transaction to perform the update. Such an implementation can maximize parallelism potential by allowing updates to non-overlapping data without initiating a cross-domain lock, but using the cross-domain lock when needed. Such an approach also centralizes updates to update logic of domain-based transactions.

Figure 3:
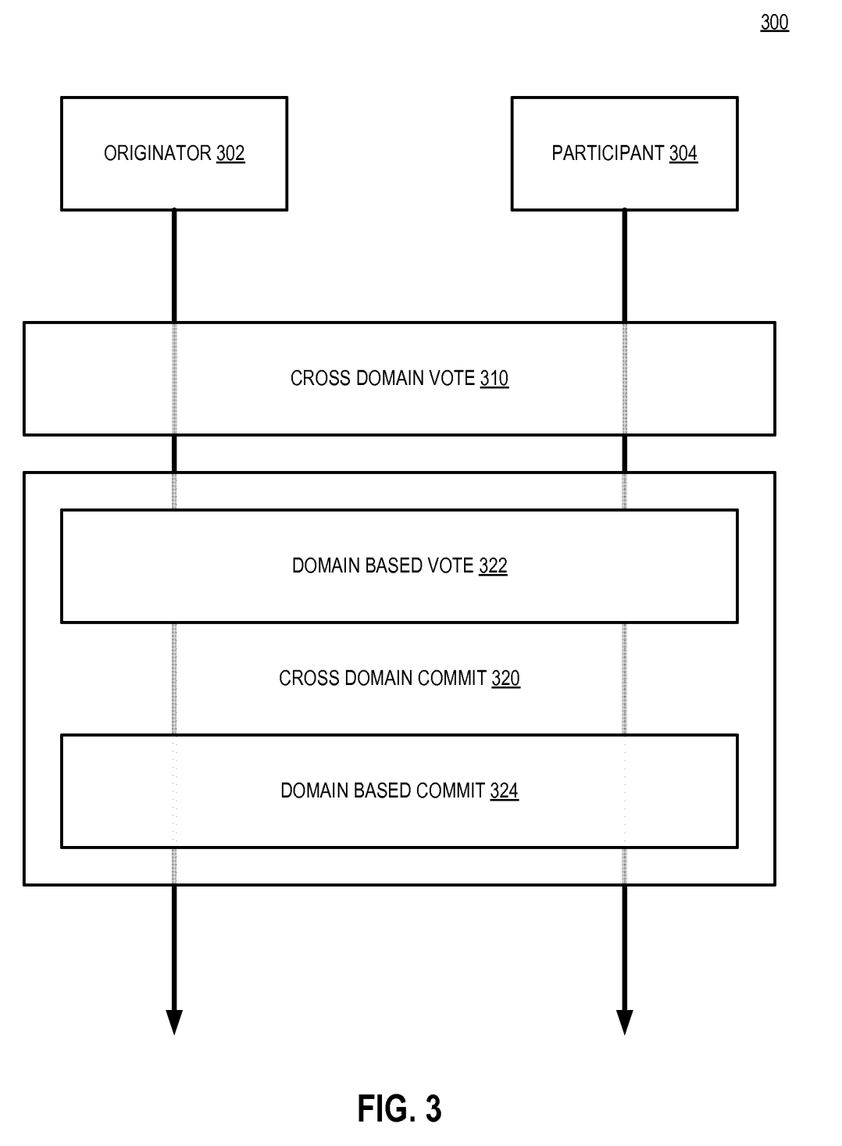
FIG. 3 is a block diagram of an embodiment of a system in which nodes update data with a consensus cross-domain lock.
Figure 4:
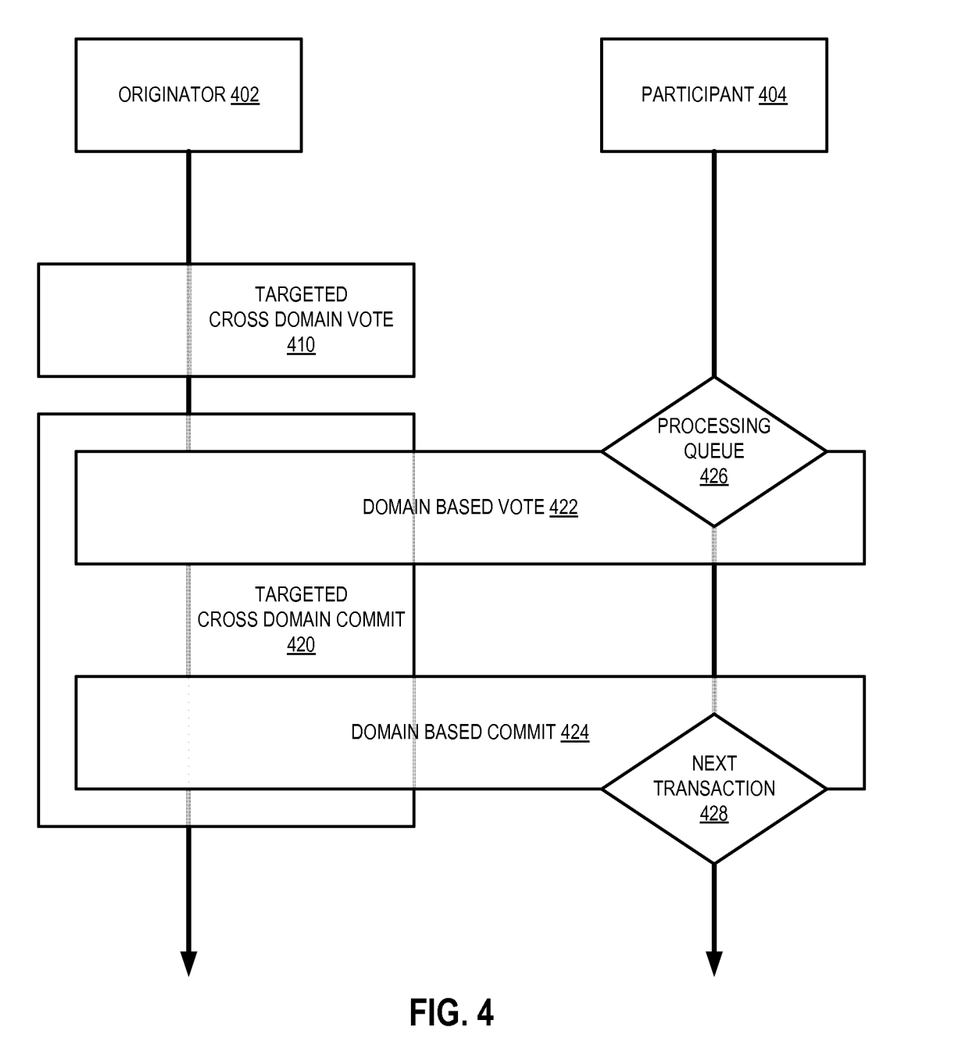
FIG. 4 is a block diagram of an embodiment of a system in which nodes update data with a targeted cross-domain lock.

Coordinating all data updates through domain-based update transactions can further be separated into different sub-approaches. In one embodiment, all nodes participate in the cross-domain transactions for the duration of the cross-domain lock. Such an approach can be referred to as a consensus transaction, and is illustrated in FIG. 3. In another embodiment, only the originator node participates in the cross-domain transaction synchronously, and the participant(s) perform the cross-domain operations asynchronously. Such an approach can be referred to as a targeted transaction, and is illustrated in FIG. 4.

FIG. 3 is a block diagram of an embodiment of a system in which nodes update data with a consensus cross-domain lock. System 300 is one example of a system in accordance with system 100 or system 200. Originator 302 and participant 304 are nodes of system 300. Originator 302 generates the update proposal to update the target data. Participant 304 is a node that stores a copy of the data, and so originator 302 sends the proposal to participant 304 to ensure consistency or synchronization of the target data in system 300. System 300 specifically shows an example of a consensus transaction.

It will be understood that the target data that is the subject of the update transaction includes overlapping data. Thus, originator 302 enters a cross-domain lock prior to updating the data. System 300 specifically illustrates a vote phase and a commit phase. It will be understood that such phases are used in 2-Phase Commit (2PC), but that other phases of other protocols could be used, or simply other operations of update coordination could be used. For the sake of example, the update transactions of FIGS. 3 and 4 will be assumed to be 2PC transactions, even though such examples are not limiting to the general principle of using cross-domain locking.

In one embodiment, originator 302 enters cross-domain vote 310, and performs the vote with participant 304 participating. Thus, both nodes are locked synchronously for the vote. When participant 304 and originator 302 both agree to enter the cross-domain transaction in vote 310, the nodes enter cross-domain commit 320. Participant 304 participates with originator 302 in cross-domain commit 320. Thus, both nodes are locked synchronously for the commit.

During cross-domain commit 320, nodes 302 and 304 perform domain-based transactions or local domain transactions vote 322 and commit 324 (which can be 2PC vote and 2PC commit phases). The cross-domain transactions can be considered of a higher order than the domain-based transactions. Thus, in one embodiment, system 300 can be said to have a hierarchy of locks or a hierarchy of transactions. In one embodiment, 2PC or another consistency protocol can be made hierarchical.

With cross-domain consensus transactions, participant 304 is not aware of when to release a cross-domain transaction. The inability of participant 304 to know when to release the cross-domain 2PC transaction can result in undesirable behavior in the case of a failure. If originator 302 encounters catastrophic failure between domain-based vote 322 and domain-based commit 324, participant 304 would theoretically wait forever for completion of the domain-based transaction. It will be understood that if participant 304 attempts to implement a timer to release cross-domain transaction 320, domain-based commit 324 could arrive after the timer expires, because of the asynchronous nature of the distributed environment of system 300. Thus, participant 304 cannot rely on timers to release the transactions, and there is a possibility of hanging the system if originator 302 fails during cross-domain commit 320.

FIG. 4 is a block diagram of an embodiment of a system in which nodes update data with a targeted cross-domain lock. System 400 is one example of a system in accordance with system 100 or system 200. Originator 402 and participant 404 are nodes of system 400. System 400 specifically shows an example of a targeted transaction. Originator 402 generates the update proposal to update the target data. Participant 404 is a node that stores a copy of the data, and so originator 402 sends the proposal to participant 404 to ensure consistency or synchronization of the target data in system 400.

Whereas in system 300, both the originator and the participant participated together in the cross-domain portions of the update, in system 400 only originator 402 is aware of the cross-domain locks. As long as originator 402 maintains the cross-domain lock, it will only propose transactions or update operations that are consistent with the cross-domain locking of overlapping data. Thus, even without participant 404 being aware of the cross-domain lock or participating directly in the cross-domain transaction, the coordination of originator 402 and participant 404 ensures the same protection for data updates as the interaction in system 300.

In the targeted cross-domain transaction, originator 402 enters cross-domain vote 410, but participant 404 does not enter cross-domain vote 410. Originator 402 then enters targeted cross-domain commit 420. Similarly, participant 404 does not enter cross-domain commit 420. Thus, only originator 402 needs to participate in the higher-level lock (e.g., the cross-domain lock). Originator 402 proposes the actual update transaction to participant 404 while the cross-domain lock is active. Originator 402 can propose domain-based vote 422 to participant 404.

It will be understood that while participant 404 does not necessarily need to participate directly in the cross-domain lock, the asynchronous nature of operations among the nodes could result in an atomicity violation of a data update (e.g., a 2PC update) for overlapped data without an ordering mechanism. The atomicity of operations can be maintained when participant 404 implements processing queue 426. Processing queue 426 allows participant 404 to receive and queue transaction operations received from originator 402, as well as other nodes in the cluster. When implemented in order (e.g., by executing the queue via a FIFO (first in, first out) principle, participant 404 executes the first operations prior to execution of subsequent operations. Thus, all operations can occur in order as they occur within originator 402 under the control of the cross-domain lock.

As illustrated, participant 404 can queue each domain-based transaction (e.g., domain-based vote 422) received from originator 402, and continue to execute whatever transaction(s) may already be in the queue. After completion of the transaction(s) in the queue that are ahead of the transaction proposed by originator 402, participant 404 can initiate the next transaction 428. Thus, originator proposes domain-based vote 422, and subsequently domain-based commit 424, which participant 404 queues. At any point when currently executing transactions complete, participant can execute the transaction(s) proposed by originator 402. In one embodiment, originator 402 awaits an acknowledgement by participant of domain-based commit 424 prior to release targeted cross-domain commit 420.

In one embodiment, participant 404 only queues overlapping data with processing queue 426. Thus, participant 404 can determine when a domain-based transaction received from originator 402 is directed to targeted data for which a transaction already exists in participant 404. If a domain-based transaction is not directed to overlapping data, participant 404 can simply execute the transaction in any order and/or in parallel with other transactions. If the domain-based transaction is directed to overlapping data as indicated by the fact that another transaction is directed to the same target data, participant 404 can queue the data to ensure it is executed subsequently to the previous transaction.

Figure 5:
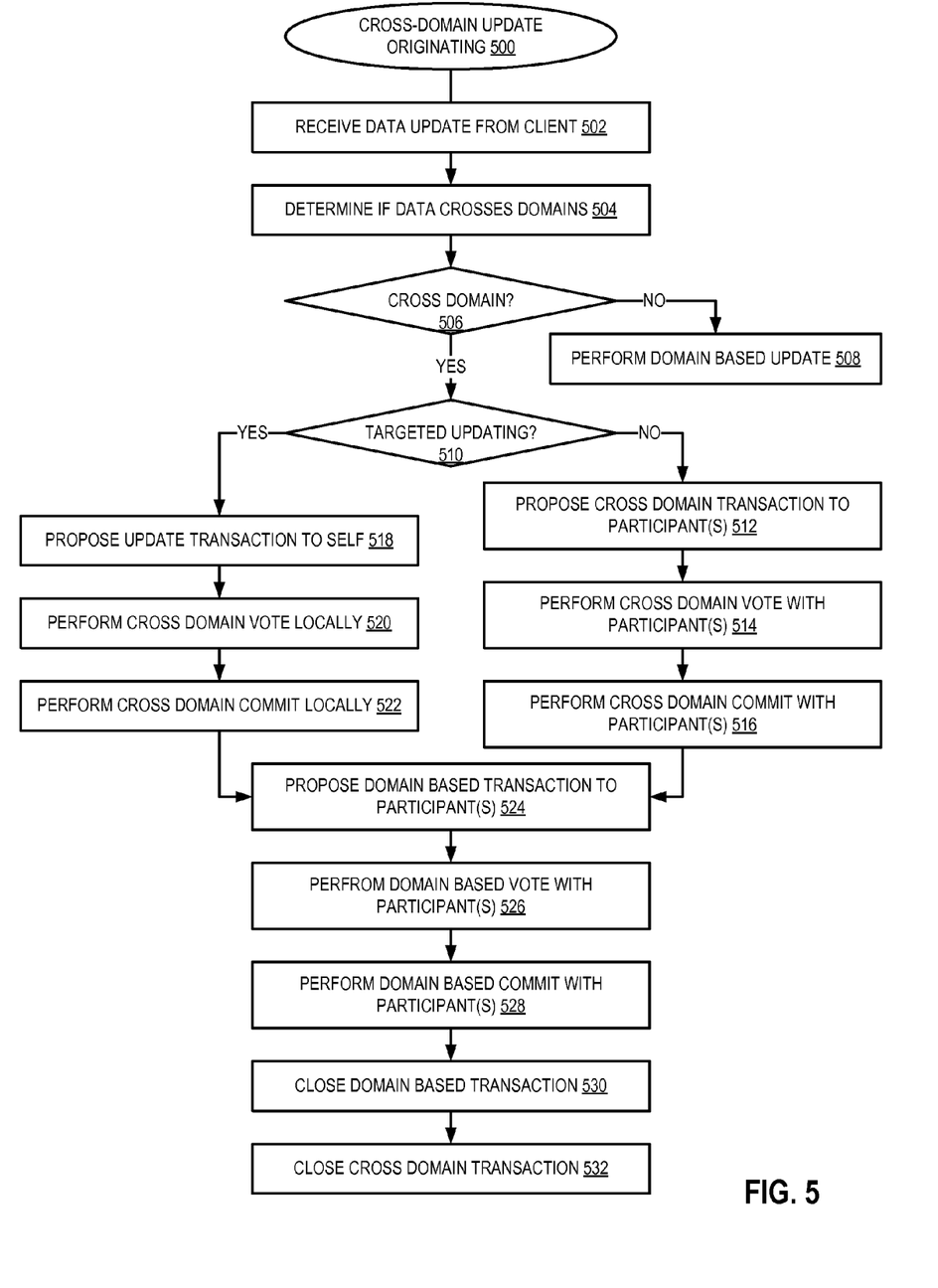
FIG. 5 is a flow diagram of an embodiment of a process for cross-domain updating from the side of the update originator node.

FIG. 5 is a flow diagram of an embodiment of a process 500 for cross-domain updating from the side of the update originator node. A node of a distributed network receives a data update from a client, block 502. The client can be any device and/or application that generates a change to protected data stored at multiple nodes of the distributed network. The receiving node determines if the data update involves overlapping data or if the target data of the request crosses data domains defined in the distributed network, block 504. If the data update does not cross domain, block 506 NO branch, the node initiates and performs a domain-based update with participant nodes, block 508. Such a domain-based update can be performed in accordance with known protocols or processes.

If the data update does cross data domains, block 506 YES branch, the node will use cross-domain locks to perform the data update. The specific implementation of the cross-domain lock can be dependent on a configuration of the system, and a configuration of the data updater of the receiving node, which is the originator node for purposes of the data update operations. If system does not implement targeted updating, block 510 NO branch, the originator proposes a cross-domain transaction to the participant node(s), block 512. In one embodiment, the cross-domain transaction includes initiating and performing a cross-domain vote with the participant(s), block 514. The participant(s) can respond affirmatively to the vote to affirm the cross-domain transaction. In one embodiment, the originator and the participant(s) perform a cross-domain commit, block 516.

If the system implements targeted updating, block 510 YES branch, the originator proposes the update transaction to itself, block 518. In one embodiment, the originator performs a cross-domain vote locally or without the participant nodes(s), block 520. The originator can thus enter a voting phase for the cross-domain transaction and send or generate a "YES" vote for the cross-domain transaction. In one embodiment, the originator then performs a cross-domain commit, block 522, which is also local to itself without the participation of other nodes. Thus, the originator can enter a commit phase for the cross-domain transaction, without sending or generating an acknowledgement. The acknowledgement would close the cross-domain transaction, and so it should not be sent prior to the nodes performing domain-based transactions for the update.

Whether the cross-domain transaction is executed locally to the originator or by consensus with the originator and participant(s), when the cross-domain lock is active the originator can propose a domain-based transaction (e.g., a 2PC transaction) to update the overlapping data, block 524. Both the originator and the participant(s) perform the domain-based vote, block 526. Thus, the nodes can enter a voting phase and vote YES for the domain-based transaction. Both the originator and the participant(s) perform the domain-based commit, block 528. Thus, for example, the nodes can enter a commit phase for the domain-based transaction and update the target data. Typically, the nodes send an acknowledgement after completing the domain-based transaction, which can operate to close out the domain-based transaction, block 530. In alternative implementations, another form of closing the transaction can be performed. Similarly, the originator can close the cross-domain transaction by sending or generating an acknowledgement, or through use of another mechanism, block 532.

Figure 6:
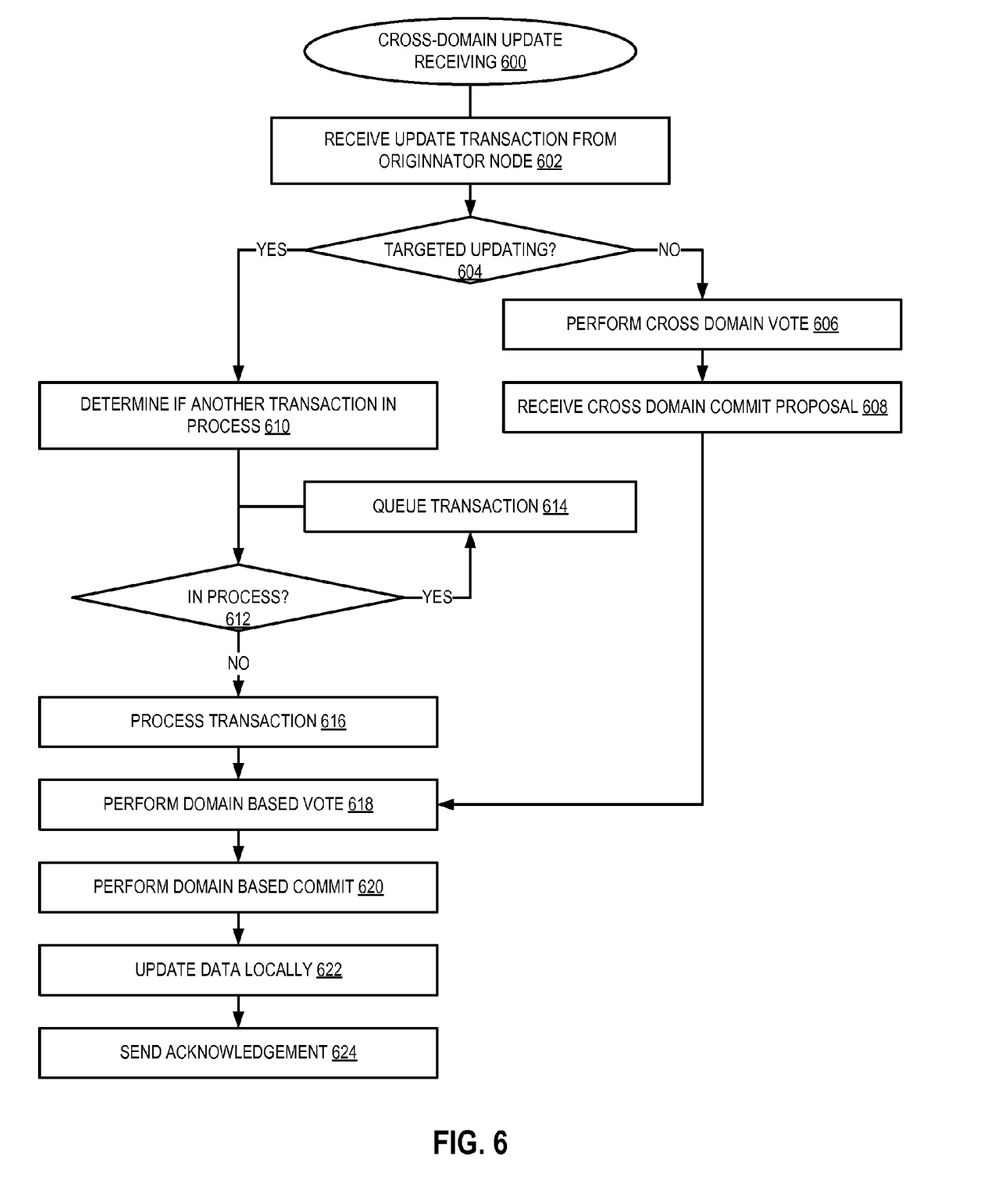
FIG. 6 is a flow diagram of an embodiment of a process for cross-domain updating from the side of the participant node.

FIG. 6 is a flow diagram of an embodiment of a process 600 for cross-domain updating from the side of the participant node. In one embodiment, a proposal participant maintains a local/node-based registry for all running or current domain-based transactions seen by the local node that will update overlapping data. In one embodiment, the participant allows any new update to proceed if no existing transactions are running. If there are one or more transactions running at the node, the participant queues new transactions until the existing domain-based transaction completes.

If the system does not implement targeted updating, block 604 NO branch, the participant will participate with the originator in the cross-domain transaction and corresponding cross-domain lock. It will be understood that the system implements a cross-domain lock in conjunction with or as part of a cross-domain transaction, just as the system implements a domain-based lock in conjunction with or as part of a domain-based transaction. The participant performs a cross-domain vote with the originator, block 606. The participant then receives a cross-domain commit proposal from the originator, block 608.

If the system implements targeted updating, block 604 YES branch, the participant processes the update transaction including determining if another transaction is in process, block 610. In an implementation where targeted updating is used, the participant will be unaware of the cross-domain transaction, which is only known to the originator. In one embodiment, the participant only checks to see if another transaction on the same target data is in process. If the participant has another transaction pending or running, block 612 YES branch, the participant queues the transaction, block 614. The participant can then proceed to execute the in process transaction prior to executing the transaction for overlapping target data.

When the participant terminates the in process transaction, block 612 NO branch, the participant then processes the next queued transaction, block 616. It will be understood that there could be multiple transactions queued, but for purposes of simplicity, assume that the processing of the transaction in block 616 refers to the transaction received in block 602. The process will work the same for each new transaction received, queued, and subsequently processed. In one embodiment, the participant creates a new registry entry for the new transaction.

The participant performs a domain-based vote, block 618. The domain-based vote will be for any new transaction received where targeted updating is used, and will be performed with the originator in the cross-domain commit when consensus updating is used. For example, the participant can enter a vote phase of a domain-based 2PC transaction in response to processing the proposal from the originator, and send a YES vote to the domain-based transaction. The participant performs a domain-based commit after the vote, block 620. For example, the participant can enter a commit phase for the domain-based transaction and update the target data locally, block 622. In one embodiment, the participant sends an acknowledgement to the originator, block 624. In one embodiment, the acknowledgement closes out domain-based transaction. If other transactions are pending in the queue, the participant can then commence the next queued domain-based transaction.

Figure 7A:
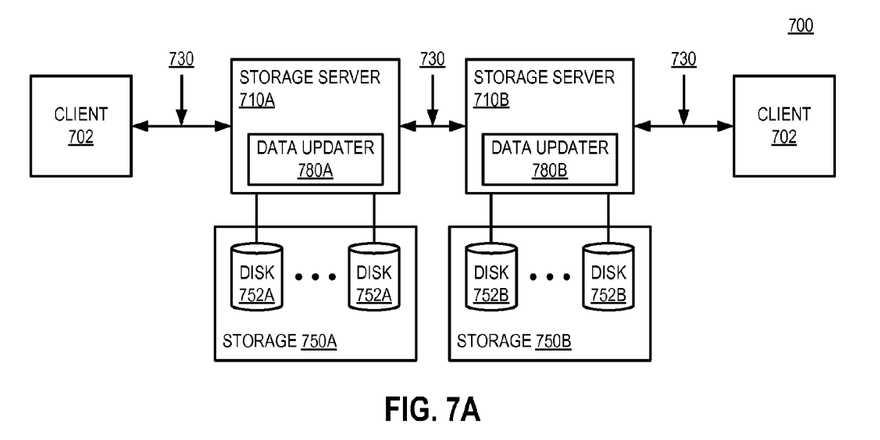
FIG. 7A illustrates a network storage system in which a data updater with cross-domain locks can be implemented.

FIG. 7A illustrates a network storage system in which a data updater with cross-domain locks can be implemented. Storage servers 710 (storage servers 710A, 710B) each manage multiple storage units 750 (storage 750A, 750B) that include mass storage devices. These storage servers provide data storage services to one or more clients 702 through a network 730. Network 730 can be, for example, a local area network (LAN), wide area network (WAN), metropolitan area network (MAN), global area network such as the Internet, a Fibre Channel fabric, or any combination of such interconnects. Each of clients 702 can be, for example, a conventional personal computer (PC), server-class computer, workstation, handheld computing or communication device, or other special or general purpose computer.

Storage of data in storage units 750 is managed by storage servers 710 which receive and respond to various read and write requests from clients 702, directed to data stored in or to be stored in storage units 750. Storage units 750 constitute mass storage devices which can include, for example, flash memory, magnetic or optical disks, or tape drives, illustrated as disks 752 (disk 752A, 752B). Storage devices 752 can further be organized into arrays (not illustrated) implementing a Redundant Array of Inexpensive Disks/Devices (RAID) scheme, whereby storage servers 710 access storage units 750 using one or more RAID protocols known in the art.

Storage servers 710 can provide file-level service such as used in a network-attached storage (NAS) environment, block-level service such as used in a storage area network (SAN) environment, a service which is capable of providing both file-level and block-level service, or any other service capable of providing other data access services. Although storage servers 710 are each illustrated as single units in FIG. 7A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module), and the N-module can include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 7B and embodiments of a D-module and an N-module are described further below with respect to FIG. 9.

In one embodiment, storage servers 710 are referred to as network storage subsystems. A network storage subsystem provides networked storage services for a specific application or purpose, and can be implemented with a collection of networked resources provided across multiple storage servers and/or storage units.

In the embodiment of FIG. 7A, one of the storage servers (e.g., storage server 710A) functions as a primary provider of data storage services to client 702. Data storage requests from client 702 are serviced using disks 752A organized as one or more storage objects. A secondary storage server (e.g., storage server 710B) takes a standby role in a mirror relationship with the primary storage server, replicating storage objects from the primary storage server to storage objects organized on disks of the secondary storage server (e.g., disks 750B). In operation, the secondary storage server does not service requests from client 702 until data in the primary storage object becomes inaccessible such as in a disaster with the primary storage server, such event considered a failure at the primary storage server. Upon a failure at the primary storage server, requests from client 702 intended for the primary storage object are serviced using replicated data (i.e. the secondary storage object) at the secondary storage server.

It will be appreciated that in other embodiments, network storage system 700 can include more than two storage servers. In these cases, protection relationships can be operative between various storage servers in system 700 such that one or more primary storage objects from storage server 710A can be replicated to a storage server other than storage server 710B (not shown in this figure). Secondary storage objects can further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 710 should be taken as illustrative only.

In one embodiment, system 700 includes data updater 780 (updater 780A, 780B), which include logic to perform data updates in a distributed system. Updater 780 is configured to perform a cross-domain transaction and/or cross-domain lock to perform updates for overlapping data. Updater 780 can be implemented in hardware and/or software of storage server 710.

Figure 7B:
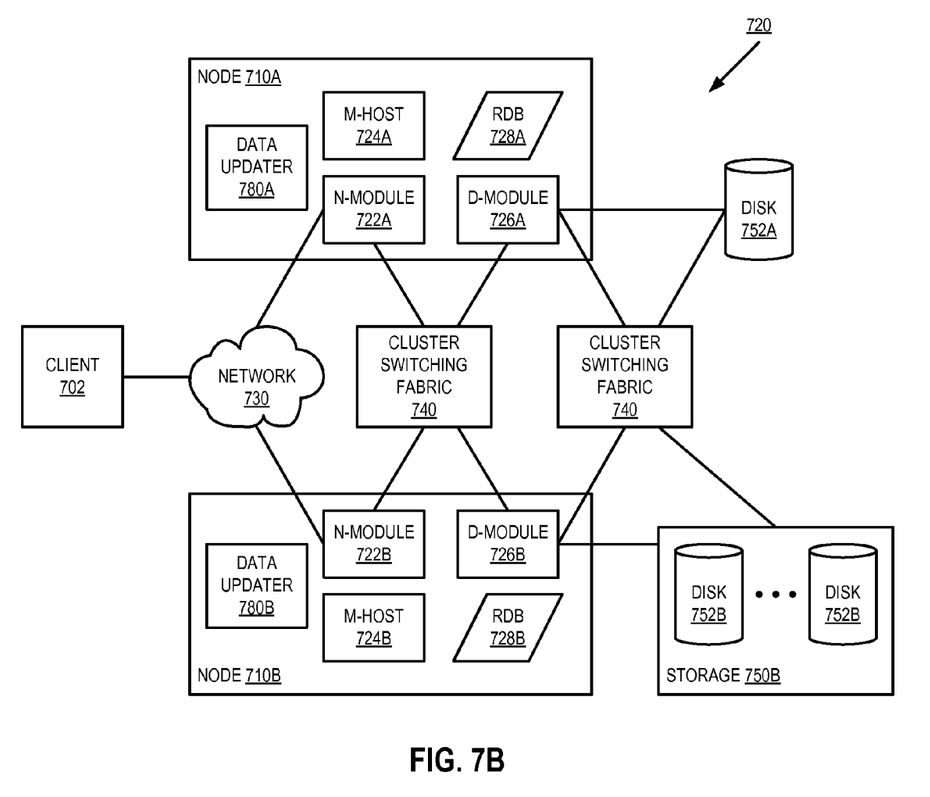
FIG. 7B illustrates a distributed or clustered architecture for a network storage system in which a data updater with cross-domain locks can be implemented in an alternative embodiment.

FIG. 7B illustrates a distributed or clustered architecture for a network storage system in which a data updater with cross-domain locks can be implemented in an alternative embodiment. System 720 can include storage servers implemented as nodes 710 (nodes 710A, 710B) which are each configured to provide access to storage devices 752. In FIG. 7B, nodes 710 are interconnected by a cluster switching fabric 740, which can be embodied as an Ethernet switch.

Nodes 710 can be operative as multiple functional components that cooperate to provide a distributed architecture of system 720. To that end, each node 710 can be organized as a network element or module (N-module 722A, 722B), a disk element or module (D-module 726A, 726B), and a management element or module (M-host 724A, 724B). In one embodiment, each module includes a processor and memory for carrying out respective module operations. For example, N-module 722 can include functionality that enables node 710 to connect to client 702 via network 730 and can include protocol components such as a media access layer, Internet Protocol (IP) layer, Transport Control Protocol (TCP) layer, User Datagram Protocol (UDP) layer, and other protocols known in the art.

In contrast, D-module 726 can connect to one or more storage devices 752 via cluster switching fabric 740 and can be operative to service access requests on devices 750. In one embodiment, the D-module 726 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 7B, a storage abstraction layer (e.g., file system) of the D-module divides the physical storage of devices 750 into storage objects. Requests received by node 710 (e.g., via N-module 722) can thus include storage object identifiers to indicate a storage object on which to carry out the request.

Also operative in node 710 is M-host 724 which provides cluster services for node 710 by performing operations in support of a distributed storage system image, for instance, across system 720. M-host 724 provides cluster services by managing a data structure such as a relational database (RDB) 728 (RDB 728A, 728B) which contains information used by N-module 722 to determine which D-module 726 "owns" (services) each storage object. The various instances of RDB 728 across respective nodes 710 can be updated regularly by M-host 724 using conventional protocols operative between each of the M-hosts (e.g., across network 730) to bring them into synchronization with each other. A client request received by N-module 722 can then be routed to the appropriate D-module 726 for servicing to provide a distributed storage system image.

Similar to what is described above, system 720 includes data updater 780 (updater 780A, 780B), which include logic to perform data updates in a distributed system. Updater 780 is configured to perform a cross-domain transaction and/or cross-domain lock to perform updates for overlapping data. Updater 780 can be implemented in hardware and/or software of storage server 710.

It will be noted that while FIG. 7B shows an equal number of N- and D-modules constituting a node in the illustrative system, there can be different number of N- and D-modules constituting a node in accordance with various embodiments. For example, there can be a number of N-modules and D-modules of node 710A that does not reflect a one-to-one correspondence between the N- and D-modules of node 710B. As such, the description of a node comprising one N-module and one D-module for each node should be taken as illustrative only.

Figure 8:
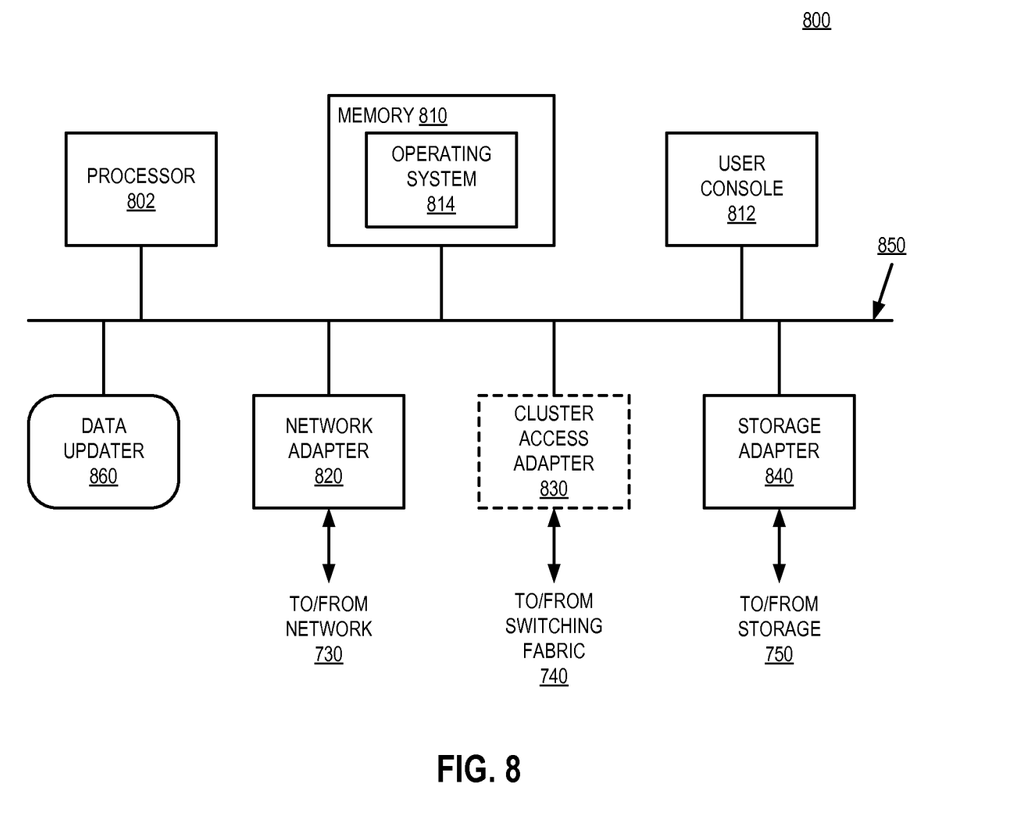
FIG. 8 is a block diagram of an illustrative embodiment of an environment of FIGS. 7A and 7B in which a data updater with cross-domain locks can be implemented.

FIG. 8 is a block diagram of an illustrative embodiment of an environment of FIGS. 7A and 7B in which a data updater with cross-domain locks can be implemented. As illustrated, the storage server is embodied as a general or special purpose computer 800 including a processor 802, a memory 810, a network adapter 820, a user console 812 and a storage adapter 840 interconnected by a system bus 850, such as a convention Peripheral Component Interconnect (PCI) bus.

Memory 810 includes storage locations addressable by processor 802, network adapter 820 and storage adapter 840 for storing processor-executable instructions and data structures associated with a multi-tiered cache with a virtual storage appliance. A storage operating system 814, portions of which are typically resident in memory 810 and executed by processor 802, functionally organizes the storage server by invoking operations in support of the storage services provided by the storage server. It will be apparent to those skilled in the art that other processing means can be used for executing instructions and other memory means, including various computer readable media, can be used for storing program instructions pertaining to the inventive techniques described herein. It will also be apparent that some or all of the functionality of the processor 802 and executable software can be implemented by hardware, such as integrated currents configured as programmable logic arrays, ASICs, and the like.

Network adapter 820 comprises one or more ports to couple the storage server to one or more clients over point-to-point links or a network. Thus, network adapter 820 includes the mechanical, electrical and signaling circuitry needed to couple the storage server to one or more client over a network. Each client can communicate with the storage server over the network by exchanging discrete frames or packets of data according to pre-defined protocols, such as TCP/IP.

Storage adapter 840 includes a plurality of ports having input/output (I/O) interface circuitry to couple the storage devices (e.g., disks) to bus 850 over an I/O interconnect arrangement, such as a conventional high-performance, FC or SAS (Serial-Attached SCSI (Small Computer System Interface)) link topology. Storage adapter 840 typically includes a device controller (not illustrated) comprising a processor and a memory for controlling the overall operation of the storage units in accordance with read and write commands received from storage operating system 814. As used herein, data written by a device controller in response to a write command is referred to as "write data," whereas data read by device controller responsive to a read command is referred to as "read data."

User console 812 enables an administrator to interface with the storage server to invoke operations and provide inputs to the storage server using a command line interface (CLI) or a graphical user interface (GUI). In one embodiment, user console 812 is implemented using a monitor and keyboard.

In one embodiment, computing device 800 includes data updater 860, which includes logic to perform data updates in a distributed system. While shown as a separate component, in one embodiment, data updater 860 is part of other components of computer 800. Data updater 860 is configured to perform a cross-domain transaction and/or cross-domain lock to perform updates for overlapping data.

When implemented as a node of a cluster, such as cluster 720 of FIG. 7B, the storage server further includes a cluster access adapter 830 (shown in phantom) having one or more ports to couple the node to other nodes in a cluster. In one embodiment, Ethernet is used as the clustering protocol and interconnect media, although it will be apparent to one of skill in the art that other types of protocols and interconnects can by utilized within the cluster architecture.

Figure 9:
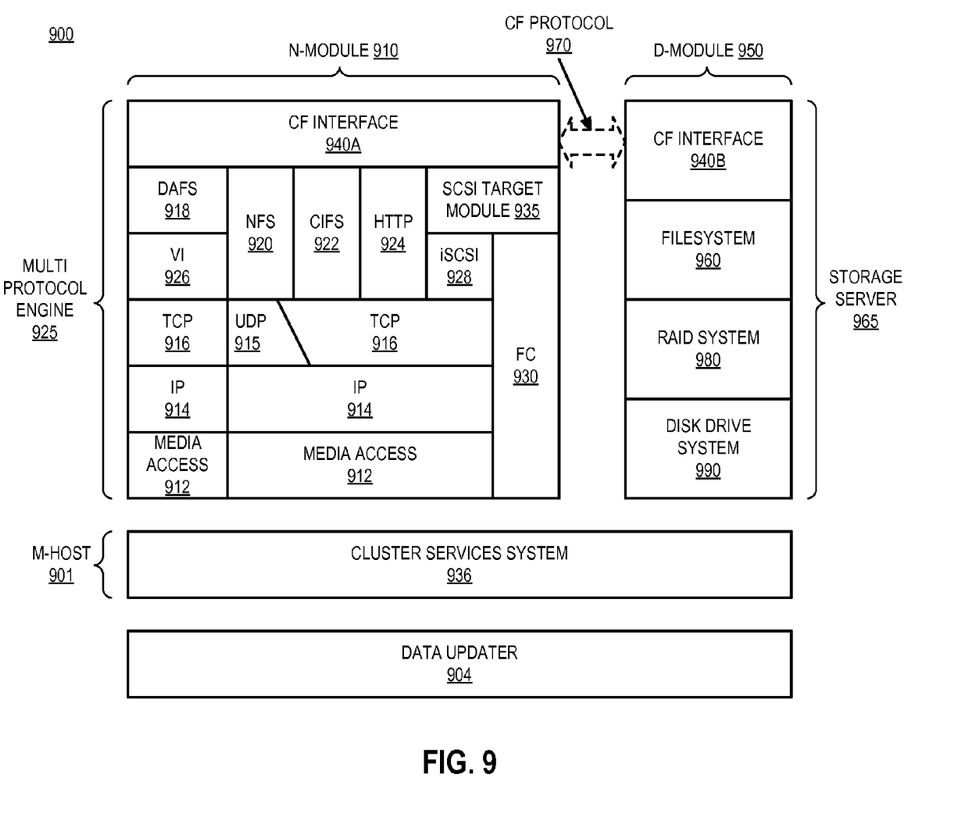
FIG. 9 illustrates an embodiment of the storage operating system of FIG. 8 in which a data updater with cross-domain locks can be implemented.

FIG. 9 illustrates an embodiment of the storage operating system of FIG. 8 in which a data updater with cross-domain locks can be implemented. The storage operating system can be an example of storage system 800, and the storage operating system can be an example of storage operating system 814 of FIG. 8. The storage operating system includes software layers executed by a processor, such as processor 802 of FIG. 8, and organized to form an integrated network protocol stack or, more generally, a multi-protocol engine 925 that provides data paths for clients to access information stored on the storage server using block and file access protocols.

Multi-protocol engine 925 includes a media access layer 912 of network drivers (e.g., gigabit Ethernet drivers) that interface with network protocol layers, such as the IP layer 914 and its supporting transport mechanisms, the TCP layer 916 and the User Datagram Protocol (UDP) layer 915. The different instances of access layer 912, IP layer 914, and TCP layer 916 are associated with two different protocol paths or stacks. A file system protocol layer provides multi-protocol file access and, to that end, includes support for the Direct Access File System (DAFS) protocol 918, the NFS protocol 920, the CIFS protocol 922 and the Hypertext Transfer Protocol (HTTP) protocol 924. A VI (virtual interface) layer 926 implements the VI architecture to provide direct access transport (DAT) capabilities, such as RDMA, as required by the DAFS protocol 918. An iSCSI driver layer 928 provides block protocol access over the TCP/IP network protocol layers, while a FC driver layer 930 receives and transmits block access requests and responses to and from the storage server. In certain cases, a Fibre Channel over Ethernet (FCoE) layer (not shown) can also be operative in multi-protocol engine 925 to receive and transmit requests and responses to and from the storage server. The FC and iSCSI drivers provide respective FC- and iSCSI-specific access control to the blocks and, thus, manage exports of luns (logical unit numbers) to either iSCSI or FCP or, alternatively, to both iSCSI and FCP when accessing blocks on the storage server.

The storage operating system also includes a series of software layers organized to form a storage server 965 that provides data paths for accessing information stored on storage devices. Information can include data received from a client, in addition to data accessed by the storage operating system in support of storage server operations such as program application data or other system data. Preferably, client data can be organized as one or more logical storage objects (e.g., volumes) that comprise a collection of storage devices cooperating to define an overall logical arrangement. In one embodiment, the logical arrangement can involve logical volume block number (vbn) spaces, wherein each volume is associated with a unique vbn.

File system 960 implements a virtualization system of the storage operating system through the interaction with one or more virtualization modules (illustrated as a SCSI target module 935). SCSI target module 935 is generally disposed between drivers 928, 930 and file system 960 to provide a translation layer between the block (lun) space and the file system space, where luns are represented as blocks. In one embodiment, file system 960 implements a WAFL (write anywhere file layout) file system having an on-disk format representation that is block-based using, e.g., 4 kilobyte (KB) blocks and using a data structure such as index nodes or indirection nodes ("inodes") to identify files and file attributes (such as creation time, access permissions, size and block location). File system 960 uses files to store metadata describing the layout of its file system, including an inode file, which directly or indirectly references (points to) the underlying data blocks of a file.

Operationally, a request from a client is forwarded as a packet over the network and onto the storage server where it is received at a network adapter. A network driver such as layer 912 or layer 930 processes the packet and, if appropriate, passes it on to a network protocol and file access layer for additional processing prior to forwarding to file system 960. There, file system 960 generates operations to load (retrieve) the requested data from the disks if it is not resident "in core", i.e., in memory 810. If the information is not in memory, file system 960 accesses the inode file to retrieve a logical vbn and passes a message structure including the logical vbn to the RAID system 980. There, the logical vbn is mapped to a disk identifier and device block number (disk, dbn) and sent to an appropriate driver of disk driver system 990. The disk driver accesses the dbn from the specified disk and loads the requested data block(s) in memory for processing by the storage server. Upon completion of the request, the node (and operating system 900) returns a reply to the client over the network.

It should be noted that the software "path" through the storage operating system layers described above needed to perform data storage access for the client request received at the storage server adaptable to the teachings of the invention can alternatively be implemented in hardware. That is, in an alternate embodiment of the invention, a storage access request data path can be implemented as logic circuitry embodied within a field programmable gate array (FPGA) or an application specific integrated circuit (ASIC). This type of hardware embodiment increases the performance of the storage service provided by the storage server in response to a request issued by a client. Moreover, in another alternate embodiment of the invention, the processing elements of adapters 820, 840 can be configured to offload some or all of the packet processing and storage access operations, respectively, from processor 802, to increase the performance of the storage service provided by the storage server. It is expressly contemplated that the various processes, architectures and procedures described herein can be implemented in hardware, firmware or software.

When implemented in a cluster, data access components of the storage operating system can be embodied as D-module 950 for accessing data stored on disk. In contrast, multi-protocol engine 925 can be embodied as N-module 910 to perform protocol termination with respect to a client issuing incoming access over the network, as well as to redirect the access requests to any other N-module in the cluster. A cluster services system 936 can further implement an M-host (e.g., M-host 901) to provide cluster services for generating information sharing operations to present a distributed file system image for the cluster. For instance, media access layer 912 can send and receive information packets between the various cluster services systems of the nodes to synchronize the replicated databases in each of the nodes.

In addition, a cluster fabric (CF) interface module 940 (CF interface modules 940A, 940B) can facilitate intra-cluster communication between N-module 910 and D-module 950 using a CF protocol 970. For instance, D-module 950 can expose a CF application programming interface (API) to which N-module 910 (or another D-module not shown) issues calls. To that end, CF interface module 940 can be organized as a CF encoder/decoder using local procedure calls (LPCs) and remote procedure calls (RPCs) to communicate a file system command between D-modules residing on the same node and remote nodes, respectively.

In one embodiment, data updater 904 includes logic layers for the operating system to perform data updates in a distributed system. Data updater 904 is configured to perform a cross-domain transaction and/or cross-domain lock to perform updates for overlapping data, in accordance with any embodiment described above. In one embodiment, tracing engine 904 is implemented on existing functional components of a storage system in which operating system 900 executes.

As used herein, the term "storage operating system" generally refers to the computer-executable code operable on a computer to perform a storage function that manages data access and can implement data access semantics of a general purpose operating system. The storage operating system can also be implemented as a microkernel, an application program operating over a general-purpose operating system, or as a general-purpose operating system with configurable functionality, which is configured for storage applications as described herein.

As used herein, instantiation refers to creating an instance or a copy of a source object or source code. The source code can be a class, model, or template, and the instance is a copy that includes at least some overlap of a set of attributes, which can have different configuration or settings than the source. Additionally, modification of an instance can occur independent of modification of the source.

Flow diagrams as illustrated herein provide examples of sequences of various process actions. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various operations or functions are described herein, which can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communications interface to send data via the communications interface. A machine readable medium or computer readable medium can cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations without departing from their scope. Therefore, the illustrations and examples herein should be construed in an illustrative, and not a restrictive sense.

What is claimed is:

1. A method in a distributed system, the method comprising:
    initiating a data update for target data in a distributed system having a cluster of nodes, wherein the target data comprises data elements, wherein multiple nodes of the cluster store copies of the target data, and wherein the data elements have previously been logically organized into multiple data domains and the copies of the data elements are logically organized accordingly;
    determining that a first data element is part of both a first and a second data domains and that a second data element is in the first data domain only;
    initiating a cross-domain lock on the first and second data domains for participant nodes to update the first data element and copies of the first data element in response to determining that the first data element is part of more than one data domain;
    initiating a first domain based lock on the first data domain;
    updating the first data element and copies of the first data element while the cross-domain lock is active;
    releasing the cross-domain lock after update of the first data element and the copies of the first data element;
    updating the second data element and the copies of the second data element while the first domain based lock is active; and
    releasing the first domain based lock after update of the second data element and the copies of the second data element.

2. The method of claim 1, wherein initiating the cross-domain lock comprises:
    temporarily combining both data domains into a single data domain; and
    locking the single data domain.

3. The method of claim 1, wherein initiating the cross-domain lock further comprises: initiating the cross-domain lock only for updates to data elements in more than one data domain and not for data elements in a single domain.

4. The method of claim 1, wherein initiating the cross-domain lock further comprises:
    separating the data update into cross-domain transactions for data elements in more than one data domain and local domain transactions for data elements in a single data domain; and
    wherein initiating the cross-domain lock is only for the cross-domain transactions.

5. The method of claim 1, wherein initiating the cross-domain lock further comprises:
    initiating the cross-domain lock from an originator node to a participant node only during a cross-domain commit phase of a synchronization protocol, wherein the cross-domain commit phase encompasses the first and the second data domains; and
    executing a local domain vote phase of the synchronization protocol with the participant node and a local domain commit phase of the synchronization protocol with the participant node during the cross-domain commit phase.

6. The method of claim 5, further comprising:
    the participant node queuing local domain operations for copies of data elements in the first and the second data domains to execute synchronization operations on the participant node in order.

7. The method of claim 1, wherein initiating the data update comprises:
  initiating the data update by implementing a two-phase commit (2PC) protocol, including initiating the cross-domain lock for a commit phase of the 2PC protocol.

8. The method of claim 7, wherein initiating the cross-domain lock further comprises:
  initiating the cross-domain lock for updates to data elements in the first and the second data domains, for both a vote phase and for the commit phase of the 2PC protocol.

9. A node device of a cluster of nodes, comprising:
  a memory device to store target data shared among multiple nodes of the cluster, wherein the target data comprises data elements stored in the memory device, at least some of which, are part of multiple data domains;
  a hardware interface to exchange data update synchronization operations with another of the multiple nodes to perform a data update of the target data; and
  update logic to,
    determine that a first data element of the target data has previously been logically organized into both a first and second data domains and that a second data element has previously been logically organized into only the first data domain;
    enter a cross-domain lock on the first and second data domains in response to a determination that the first data element is part of both the first and the second data domains;
    enter a first domain based lock on the first data domain;
    update the first data element while the cross-domain lock is active;
    deactivate the cross-domain lock after update of the first data element;
    update the second data element while the first domain based lock is active; and
    deactivate the first domain based lock after update of the second data element.

10. The node device of claim 9, wherein the update logic is configured to initiate the cross-domain lock only for updates to data elements in more than one data domain and not for data elements in a single data domain.

11. The node device of claim 9, wherein the update logic is configured to:
  initiate the cross-domain lock only during a cross-domain commit phase of a synchronization protocol, wherein the cross-domain commit phase encompasses the first and the second data domains; and
  execute a local domain vote phase of the synchronization protocol with the participant node and a local domain commit phase of the synchronization protocol with the participant node during the cross-domain commit phase.

12. The node device of claim 11, wherein the node device is a participant node, and further comprising the update logic configured to:
  queue local domain operations for data elements in more than one data domain to execute synchronization operations in order.

13. The node device of claim 9, wherein the update logic is configured to:
  implement a two-phase commit (2PC) protocol process to update the target data, including initiating the cross-domain lock for a commit phase of the 2PC protocol.

14. The node device of claim 13, wherein the update logic is configured to
  initiate the cross-domain lock only for updates to data elements in more than one data domain, for both a vote phase and for the commit phase of the 2PC protocol.

15. A computer-readable storage medium having program code stored thereon, the program code to:
  initiate a data update for target data in a distributed system having a cluster of nodes, wherein the target data comprises data elements, wherein multiple nodes of the cluster store copies of the target data, and wherein the data elements have previously been organized into multiple data domains and the copies of the data elements are logically organized into the multiple domains accordingly;
  determine that a first data element is part of both a first and second data domains and that a second data element is only in the first data domain;
  initiate a cross-domain lock on the first and second data domains for participant nodes to update the first data element and copies of the first data element in response to a determination that the first data element is part of both the first data domain and the second data domain;
  initiate a first domain based lock on the first data domain;
  update the first data element and copies of the first data element while the cross-domain lock is active;
  deactivating the cross-domain lock after updating the first data element and copies thereof;
  update the second data element and copies thereof while the first domain based lock is active; and
  deactivate the first domain based lock after update of the second data element and the copies thereof.

16. The computer-readable storage medium of claim 15, wherein the program code to initiate the cross-domain lock further comprises program code to:
  separate the data update into cross-domain transactions for data elements in more than one data domain and local domain transactions for data elements in a single data domain; and
  the program code initiates the cross-domain lock only for the cross-domain transactions.

17. The computer-readable storage medium of claim 15, wherein the program code to initiate the cross-domain lock further comprises program code to:
  initiate the cross-domain lock from a originator node to a participant node only during a cross-domain commit phase of a synchronization protocol, wherein the cross-domain commit phase encompasses the first and the second data domains; and
  execute a local domain vote phase of the synchronization protocol with the participant node and a local domain commit phase of the synchronization protocol with the participant node during the cross-domain commit phase.

18. The computer-readable storage medium of claim 17, further comprising program code to queue local domain operations for copies of data elements in the first and the second data domains to execute synchronization operations on the participant node in order.

19. The computer-readable storage medium of claim 15, wherein the program code to initiate the data update comprises program code to initiate the data update by implementing a two-phase commit (2PC) protocol, including initiation of the cross-domain lock for a commit phase of the 2PC protocol.

20. The computer-readable storage medium of claim 19, wherein the program code to initiate the cross-domain lock further comprises program code to initiate the cross-domain lock only for updates to data elements in the first and the second data domains, for both a vote phase and for the commit phase of the 2PC protocol.

* * * * *